March 22, 1932.　　　S. E. ARCHIBALD　　　1,850,649

BRAKE DRUM

Filed July 8, 1931

Inventor

Senes E. Archibald,

By Clarence A. O'Brien

Attorney

Patented Mar. 22, 1932

1,850,649

UNITED STATES PATENT OFFICE

SENES EDWARD ARCHIBALD, OF BRADFORD, PENNSYLVANIA

BRAKE DRUM

Application filed July 8, 1931. Serial No. 549,522.

This invention relates to certain new and useful improvements in brake drums having particular reference to vehicular wheel brake drums and the object of the present invention is to reduce to a minimum trouble arising from the heating of brakes.

A still further object of the invention is to provide a brake drum having a lining covering the inner face of the peripheral wall of the brake drum, together with improved means for anchoring the lining within the drum.

Other objects and advantages of the invention will be apparent from the following description, taken in connection with the accompanying drawings wherein.

With reference more in detail to the drawings, it will be seen that 5 designates generally a brake drum which is circular, and the peripheral wall 6 of the brake drum on its inner face is provided with a circular series of mortise grooves 7.

Figure 1:
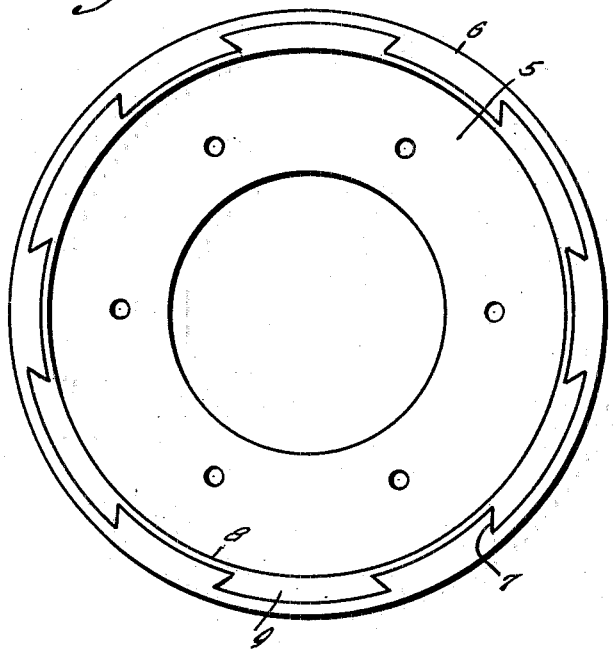
Figure 1 is an elevational view of a brake drum constructed in accordance with the present invention.
Figure 2:
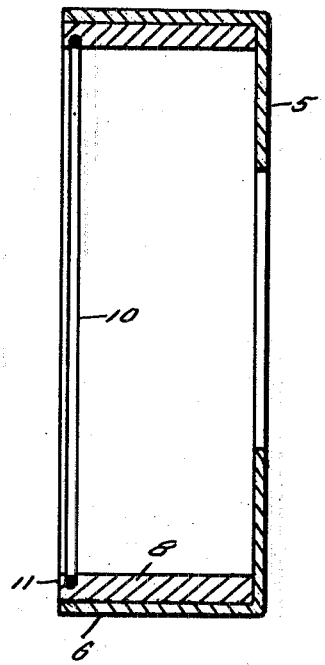
Figure 2 is a longitudinal sectional view therethrough.
Figure 3:
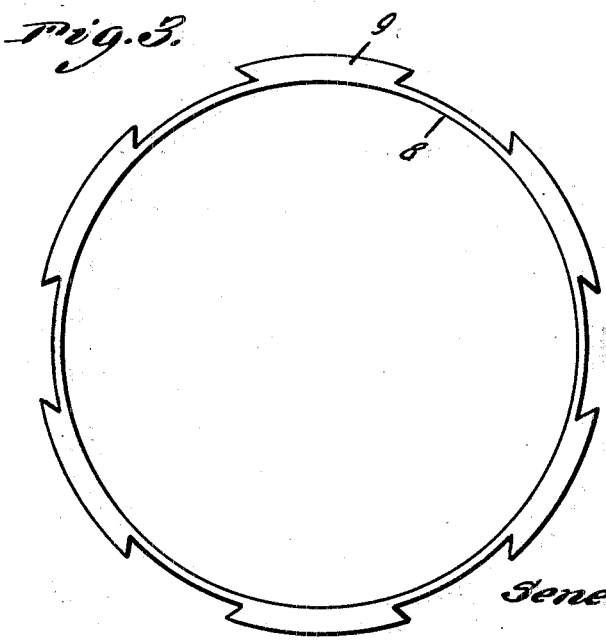
Figure 3 is a plan view of the brake lining.
Figure 4:
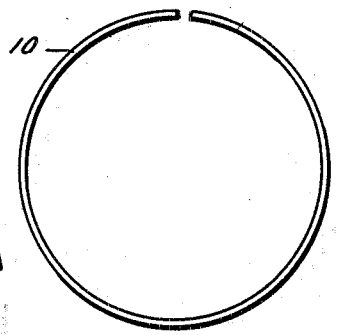
Figure 4 is a plan view of two retaining rings.

An annular or circular brake lining 8 formed of asbestos or other suitable material is provided on its outer face with a series of mortise ribs 9 fitting conformably within the grooves 7 as shown in Figure 1 thus covering the entire inner face of the wall 6.

A split resilient retaining ring 10 fits within the confines of the lining 8, and is received within an annular groove 11 provided on the inner peripheral face of the lining 8 at that end of the lining adjacent the open end of the drum 5.

Thus it will be seen, that through the medium of the mortise tongue and groove connection between the wall of the brake drum and the lining therefor together with the ring 10, the lining will be securely retained in position within the brake drum and against rotative movement relative to the drum.

In providing the lining 8 of molded asbestos, heat would be prevented, and as is also thought apparent when the lining is worn out a new lining may be readily substituted therefor.

Further the arrangement of a lining of this character within the drum will materially reduce the expenses of truing the drum, it being necessary only to replace worn lining with a new one. Further, a drum provided with the features of the present invention will not only be less liable to heat, but grabbing of brakes, squeaking, and longer life at less expense will be some of the many advantages of a brake of this character.

Even though I have herein shown and described the preferred embodiment of the invention, it is to be understood that the same is susceptible of further changes, modifications and improvements coming within the scope of the appended claims.

Having thus described my invention, what I claim as new is:

1. In combination a brake drum having a peripheral wall provided with grooves, an annular lining fitting within the drum and provided with a circular series of tongues fitting within said grooves, and an expansible member arranged within the confines of the lining and normally urging the same radially into engagement with the periphery of the drum.

2. In combination a brake drum, an annular lining fitted within the drum, and means for securing said lining within the drum, said last mentioned means including mortise connection between the peripheral wall of the drum and said lining, together with a split ring arranged within the confines of said lining.

3. In combination a brake drum, an annular lining fitted within the drum, and means for securing said lining within the drum, said last mentioned means including mortise connection between the peripheral wall of the drum and said lining, together with a split ring arranged within the confines of said lining, and said lining provided with a circular groove for receiving said ring.

In testimony whereof I affix my signature.

SENES EDWARD ARCHIBALD.